(12) United States Patent
Tanaka et al.

(10) Patent No.: US 11,501,592 B2
(45) Date of Patent: Nov. 15, 2022

(54) COIN TRANSPORTING BELT AND COIN HANDLING MACHINE

(71) Applicant: GLORY LTD., Hyogo (JP)

(72) Inventors: Mitsuo Tanaka, Hyogo (JP); Yusuke Yoshida, Hyogo (JP)

(73) Assignee: GLORY LTD., Hyogo (JP)

( * ) Notice: Subject to any disclaimer, the term of this patent is extended or adjusted under 35 U.S.C. 154(b) by 170 days.

(21) Appl. No.: 16/556,426

(22) Filed: Aug. 30, 2019

(65) Prior Publication Data

US 2020/0074779 A1    Mar. 5, 2020

(30) Foreign Application Priority Data

Sep. 3, 2018  (JP) .............................. JP2018-164257

(51) Int. Cl.
*G07D 1/00* (2006.01)
*G07D 9/06* (2006.01)

(52) U.S. Cl.
CPC ................ *G07D 1/00* (2013.01); *G07D 9/06* (2013.01)

(58) Field of Classification Search
CPC ........................................................ G07D 1/00
See application file for complete search history.

(56) References Cited

U.S. PATENT DOCUMENTS

| 8,776,993 | B2  |       | 7/2014 | Umeda     |            |
|-----------|-----|-------|--------|-----------|------------|
| 8,960,413 | B2  |       | 2/2015 | Umeda     |            |
| 10,625,944| B2  | *     | 4/2020 | Shakushiro| B65G 15/44 |
| 2010/0203817 | A1 | *   | 8/2010 | Rigo      | G07D 5/00  |
|           |     |       |        |           | 453/3      |
| 2013/0186735 | A1 |     | 7/2013 | Umeda     |            |
| 2014/0323024 | A1 | *   | 10/2014| Martinez Chavoy | B65G 21/209 |
|           |     |       |        |           | 453/56     |
| 2014/0332350 | A1 | *   | 11/2014| Umeda     | B65G 15/30 |
|           |     |       |        |           | 198/688.1  |
| 2015/0371475 | A1 | *   | 12/2015| Blythin   | G07D 9/04  |
|           |     |       |        |           | 453/18     |
| 2015/0371478 | A1 | *   | 12/2015| Blythin   | G07D 9/00  |
|           |     |       |        |           | 453/18     |

FOREIGN PATENT DOCUMENTS

| EP | 1854747 A1 | 11/2007 |
| JP | 7-69416 A | 3/1995 |
| JP | 2010-205230 A | 9/2010 |
| JP | 2013-152628 A | 8/2013 |
| JP | 2014-73880 A | 4/2014 |
| JP | 2018-60318 A | 4/2018 |

OTHER PUBLICATIONS

Extended European Search Report dated Jan. 30, 2020, issued in corresponding European Patent Application No. 19194743.1, 10 pages.
Japanese Office Action dated Mar. 23, 2022, in corresponding Japanese Patent Application 2018-164257.

* cited by examiner

*Primary Examiner* — Thien M Le
*Assistant Examiner* — Asifa Habib
(74) *Attorney, Agent, or Firm* — Xsensus LLP (57) ABSTRACT

A coin transporting belt comprises a toothed belt with teeth formed on both surfaces of a belt unit, and an engagement member for engaging and transporting a coin attached to the toothed belt. The engagement member comprises: an attachment portion attached to the toothed belt; and a contact portion formed into a linear shape extending in a direction perpendicular to a long-edge direction of the toothed belt. The contact portion is to contact the coin.

20 Claims, 4 Drawing Sheets

| | TRANSPORTING STATE | DIMENSIONAL RELATIONSHIP |
|---|---|---|
| COMPARATIVE EXAMPLE (JAPANESE COINS) | | |
| COMPARATIVE EXAMPLE (FOREIGN COINS) | | |
| EMBODIMENT (FOREIGN COINS) | | |

COIN TRANSPORTING BELT AND COIN HANDLING MACHINE

FIELD OF THE INVENTION

The present invention relates to a coin transporting belt for transporting coins and a coin handling machine using the coin transporting belt.

BACKGROUND OF THE INVENTION

Conventional coin handling machines are disclosed in Japanese Laid-open Patent Publication No. 7-69416, Japanese Laid-open Patent Publication No. 2013-152628, and Japanese Laid-open Patent Publication No. 2010-205230, for example. In the conventional coin handling machine, a coin transporting belt is suspended over a transport path of coins. The coins are transported one by one by the coin transporting belt and subjected to process such as recognition or classification of the coins. In some cases, the coin transporting belt is configured using a toothed belt with a plurality of teeth provided on one surface or on both surfaces of a belt unit, and an engagement member for engagement and transporting of coins is attached to the toothed belt.

If such a coin transporting belt uses a toothed belt with a plurality of teeth provided on both surfaces of the belt unit, a dedicated toothed belt for attachment of the engagement member is required.

The engagement member comprises a contact portion to contact coins. In many cases, the engagement member is configured to be fixed by inserting a pin projecting from the contact portion into an insertion hole formed at the belt. Such an engagement member does not comprise a baffle of the pin, so that the shape of the contact portion is generally circular along a peripheral surface such as a disk-like shape or a circular columnar shape. The peripheral surface of the contact portion contacts the peripheral surface of a coin to push the peripheral surface of the coin with the peripheral surface of the contact portion in a transporting direction. In this way, the coin is transported.

If a diameter difference is small between coins of target denominations to be handled by the coin handling machine, the peripheral surface of the contact portion contacts peripheral surface positions near the center line of a transporting direction of the coins to allow the coins to be pushed in a direction substantially following the transporting direction. By contrast, in some countries, there is a large diameter difference between coins of target denominations to be handled by the coin handling machine. In such cases, the peripheral surface of the contact portion is to contact peripheral surface positions largely deviating from the center line of the transporting direction of the coins to unfortunately push the coins with the peripheral surface of the contact portion obliquely from the transporting direction. This may result in failure to transport the coins along the transport path.

Moreover, if a toothed belt with a plurality of teeth provided on both surfaces of the belt unit is to be used, a dedicated toothed belt for attachment of the engagement member to the belt unit is required. Additionally, if there is a large difference between coin diameters, the configuration of the foregoing coin transporting belt causes the risk of failing to transport the coins stably.

SUMMARY OF THE INVENTION

A coin transporting belt of the present invention comprises: a toothed belt with a plurality of teeth formed on both surfaces of a belt unit; and an engagement member that engages and transports a coin attached to the toothed belt. The engagement member comprises: an attachment portion attached to the toothed belt; and a contact portion formed into a linear shape extending in a direction perpendicular to a long-edge direction of the toothed belt, the contact portion contacting the coin.

The contact portion extends more widely than the attachment portion in the perpendicular direction to project from at least both sides of the attachment portion.

The contact portion projects from the both sides of the attachment portion by the same length.

The contact portion projects from one side of the attachment portion.

The contact portion has a width having a relationship of: (width of the contact portion)≥(radius of a largest-diameter coin to be handled)−(radius of a smallest-diameter coin to be handled).

The contact portion has a planar contact surface to contact the coin.

The contact portion has a comb-like contact surface at a part to contact the coin.

The contact portion has an oval contact surface to contact the coin.

The contact portion has planar contact surfaces to contact the coin provided on both surfaces of the contact portion and extending in a direction following the long-edge direction of the toothed belt.

The contact portion projects more widely than the attachment portion in a direction following the long-edge direction of the toothed belt.

The attachment portion grips the belt unit.

The attachment portion is connected at one end side, and at the other end side of the attachment portion, the attachment portion is separated and includes a first gripper and a second gripper catching the belt unit of the toothed belt therebetween, and a retainer arranged at least at the first gripper at the other end side and engaged with the toothed belt.

The attachment portion is connected at one end side, and at the other end side of the attachment portion, the attachment portion is separated and includes a first gripper and a second gripper catching the belt unit of the toothed belt therebetween, and a retainer arranged at least at the first gripper and engaged with the tooth of the toothed belt.

The toothed belt includes a cutout at the tooth, and the retainer is fitted into the cutout at the tooth.

A coin handling machine of the present invention includes: a transport path along which the coin is to move; and the foregoing coin transporting belt suspended over the transport path and engaging and transporting the coin on the transport path using the engagement member.

DETAILED DESCRIPTION OF THE PREFERRED EMBODIMENT

A first embodiment of the present invention will be described below by referring to FIGS. 1 to 5.

Figure 1:
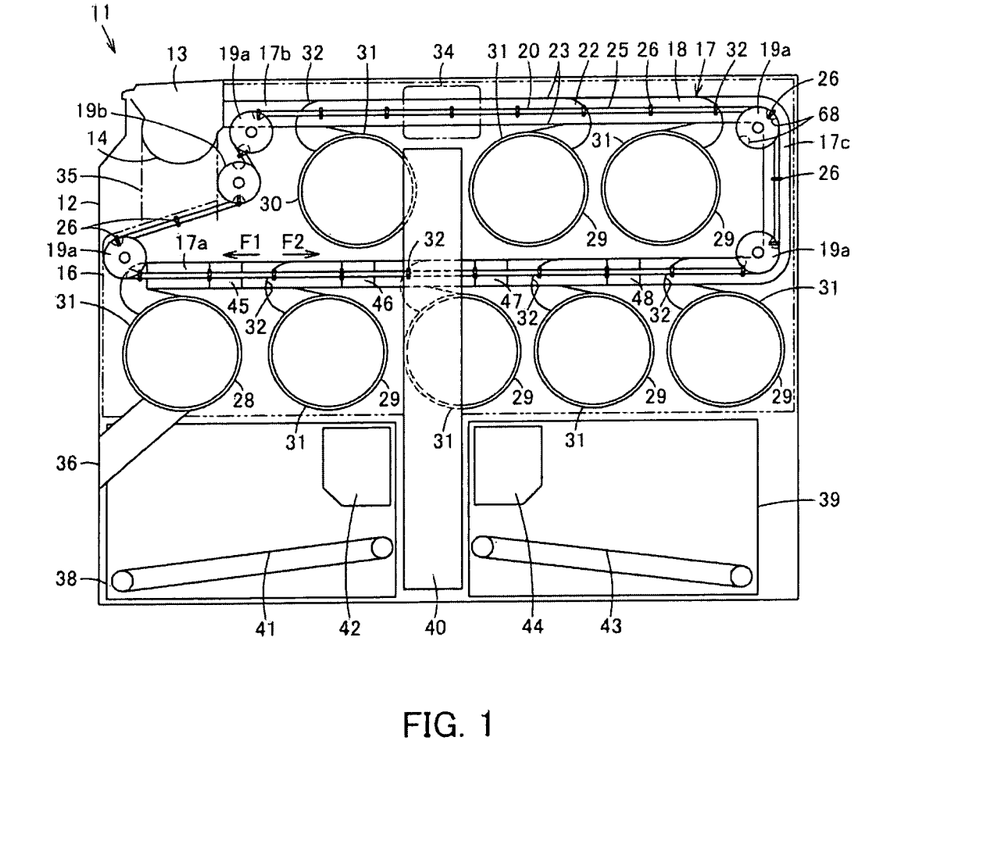
FIG. 1 is a side view showing the internal configuration of a coin handling machine using a coin transporting belt according to a first embodiment of the present invention.

FIG. 1 shows a coin handling machine 11. The coin handling machine 11 is a coin depositing and dispensing machine for depositing and dispensing of coins. The coin handling machine 11 comprises a machine body 12. The machine body 12 has an upper front side (left side of FIG. 1) provided with a transaction port 13 functioning as a depositing port for deposition of coins and as a dispensing port for dispensing of coins. The transaction port 13 is provided with an openable and closable shutter (not shown in the drawings).

A tray 14 for accepting and storing coins is formed below the transaction port 13. The tray 14 accepts coins to be deposited input through the transaction port 13 from the outside of the machine body 12, and accepts coins to be dispensed through the transaction port 13 from the interior of the machine body 12 or coins to be returned. A part of the bottom surface of the tray 14 is openable and closable. In response to opening of the part of the bottom surface of the tray 14, coins are ejected downward.

A base 16 is arranged at an upper part of the machine body 12 in such a manner that an upper part of the base 16 is tilted toward the back face of the machine body 12 relative to the vertical direction (in a view from the front face of the machine body 12, the upper part of the base 16 is tilted leftward relative to the vertical direction). A transport unit 17 that transports coins one by one in a separated state is provided on a surface of the base 16 pointed upward. The transport unit 17 comprises a transport path 18 along which coins move and a coin transporting belt 20. The coin transporting belt 20 is suspended by a plurality of pulleys 19a and 19b in such a manner as to move along the transport path 18.

The transport path 18 comprises a transport surface 22 on which one side of a coin is placed and the coin moves, and a guide portion 23 arranged on each of both sides of the transport surface 22 in a width direction and used for guiding the peripheral surface of a coin. The transport path 18 is provided in a tilted shape so as to tilt the transport surface 22 in response to the tilt of the surface of the base 16.

The coin transporting belt 20 is suspended by the plurality of pulleys 19a and 19b at a height position at a predetermined interval from the transport path 18 for allowing acceptance of coins. The inner peripheral side of the coin transporting belt 20 is wound around the plurality of pulleys 19a. The outer peripheral side of the coin transporting belt 20 is wound around the pulley 19b. The coin transporting belt 20 moves on the transport path 18 in response to rotation of any one of the pulleys 19a caused by a motor. The coin transporting belt 20 comprises a toothed belt (timing belt) 25 and a plurality of engagement members 26. The engagement members 26 are attached at predetermined intervals in the long-edge direction of the toothed belt 25. The coin transporting belt 20 is configured to accept and transport coins one by one between the transport path 18 and the coin transporting belt 20 and between the engagement members 26 adjacent to each other in the belt long-edge direction.

The transport unit 17 comprises a first transport unit 17a, a second transport unit 17b, and a third transport unit 17c. The first transport unit 17a is provided to extend in the front-rear direction of the machine body 12. The second transport unit 17b is provided at a higher position than the first transport unit 17a to extend in the front-rear direction of the machine body 12. The third transport unit 17c connects the rear ends of the first transport unit 17a and the second transport unit 17b. The front end of the second transport unit 17b is connected to the transaction port 13 to allow ejection of coins transported to the front end of the second transport unit 17b to the tray 14. A direction in which coins are transported from the second transport unit 17b toward the third transport unit 17c and the first transport unit 17a will be called a storing transporting direction F1. Conversely, a direction in which coins are transported from the first transport unit 17a toward the third transport unit 17c and the second transport unit 17b will be called a feeding transporting direction F2.

The coin transporting belt 20 is suspended over the transport path 18. On the other hand, a position between the front end of the first transport unit 17a and the front end of the second transport unit 17b of the transport unit 17 deviates from the transport path 18. The outer peripheral side of the coin transporting belt 20 that moves between the front end of the first transport unit 17a and the front end of the second transport unit 17b is wound around the pulley 19b at the position deviating from the transport path 18.

A feeder 28 is connected to the front end of the first transport unit 17a on the transport path 18. Denomination-specific stackers 29 as a plurality of denomination-specific storing and ejecting portions are connected to the first transport unit 17a at positions behind the feeder 28 and to the second transport unit 17b. A temporary holder 30 is connected to the second transport unit 17b at a position in front of the denomination-specific stackers 29. The feeder 28, the denomination-specific stackers 29, and the temporary holder 30 each comprise a storing portion 31 in which coins are accepted from the transport path 18 and stored. The coins stored in the storing portion 31 can be fed one by one to the transport path 18 using centrifugal force from a rotary disk, for example. It is noted that the feeder 28, the denomination-specific stackers 29, and the temporary holder 30 basically have the same configuration, while they are pointed in different directions responsive to the orientations of coins in a transporting direction.

The transport path 18 is provided with a guide mechanism 32 provided at a position corresponding to each connection position of the feeder 28, the denomination-specific stackers 29, and the temporary holder 30. The guide mechanism 32 is configured to be switched between a guide position and a passing position. The guide position guide coins to be transferred and received between each of the feeder 28, the denomination-specific stackers 29 and the temporary holder 30, and the transport path 18. The passing position is configured to pass coins being transported in the transport path 18 downstream in a transporting direction. The guide mechanism 32 corresponding to the denomination-specific stacker 29 at the second transport unit 17b and the other guide mechanism 32 basically have the same configuration, while they are pointed in different directions responsive to the orientations of coins in a transporting direction.

Moreover, a recognition unit 34 is provided between the denomination-specific stacker 29 at the second transport unit 17b and the temporary holder 30 for recognizing a coin being transported to determine at least the denomination of the coin, whether the coin is genuine or counterfeit, or whether the coin is fit or unfit, for example.

The feeder 28 is provided with a chute 35 located below the tray 14 and between the tray 14 and the feeder 28, and used for guiding coins ejected from the tray 14 to the feeder 28. The feeder 28 allows discharge of a foreign material input together with a coin to be deposited and return of the foreign material to a return port 36 provided on the front face of the machine body 12.

Furthermore, an overflow stacker 38 and a coin cassette 39 are arranged at a lower part of the interior of the machine body 12. The overflow stacker 38 stores overflowing coins that cannot be stored in the denomination-specific stacker 29. The coin cassette 39 stores coins as replenishment or collected coins. A transport mechanism 40 is arranged between the overflow stacker 38 and the coin cassette 39 for transporting coins fed from the overflow stacker 38 and the coin cassette 39 to the temporary holder 30 at a higher position.

The overflow stacker 38 includes a feeding mechanism 41 provided at the bottom of a storage region in which coins are stored, and a collection cassette 42 capable of being attached to and detached from an upper part of the storage region. The feeding mechanism 41 feeds coins to the transport mechanism 40. The collection cassette 42 stores coins remaining forgotten in the tray 14. The coin cassette 39 comprises a feeding mechanism 43 for feeding coins to the transport mechanism 40 provided at the bottom of a storage region in which coins are stored, and a reject box 44 provided at an upper part of the storage region for storing rejected coins.

The first transport unit 17a comprises a diverting portion 45, a diverting portion 46, a diverting portion 47, and a diverting portion 48. The diverting portion 45 diverts overflowing coins into the overflow stacker 38. The diverting portion 46 diverts forgotten coins into the collection cassette 42. The diverting portion 47 diverts rejected coins into the reject box 44. The diverting portion 48 diverts collected coins into the coin cassette 39.

The configuration of the coin transporting belt 20 shown in FIGS. 2 to 4 will be described next.

The coin transporting belt 20 comprises the toothed belt 25 and the plurality of engagement members 26 attached to the toothed belt 25 in a manner allowing removal from the toothed belt 25. The engagement members 26 are attached to optional predetermined positions of the toothed belt 25 and separated at predetermined intervals in a long-edge direction (belt long-edge direction) A of the toothed belt 25 in a manner allowing removal from the toothed belt 25.

The toothed belt 25 comprises an endless belt unit 50, a plurality of teeth 51 and a plurality of teeth 52 projecting from both surfaces of the belt unit 50 comprising an inner peripheral surface 50a corresponding to one surface and an outer peripheral surface 50b corresponding to the other surface, a tooth groove 53 between the tooth 51 and the tooth 51, and a tooth groove 54 between the tooth 52 and the tooth 52.

The belt unit 50 is formed into a band-like shape in which a belt width defined in a direction crossing the long-edge direction A of the belt unit 50, namely, a belt width defined between the inner peripheral surface 50a and the outer peripheral surface 50b is greater than a belt thickness.

The tooth 51 projecting from one surface of the belt unit 50, which is the inner peripheral surface 50a, for example, projects in a belt width direction B of the belt unit 50 into a substantially trapezoidal shape in a section in such a manner as to get narrower toward a side corresponding to the tip in the projecting direction. Further, a cutout 55 without the tooth 51 is formed at an intermediate position in the belt width direction B. Namely, the cutout 55 resulting from cutting of a part of the tooth 51 is formed at the intermediate position in the belt width direction B. The tooth groove 53 is formed between the tooth 51 and the tooth 51 adjacent to each other on the inner peripheral surface 50a of the belt unit 50. The tooth 52 projecting from the other surface of the belt unit 50, which is the outer peripheral surface 50b, for example, projects from an intermediate position of the belt unit 50 in the belt width direction B into a substantially trapezoidal shape in a section in such a manner as to get narrower toward a side corresponding to the tip in the projecting direction. Further, the tooth groove 54 is formed between the tooth 52 and the tooth 52 adjacent to each other on the outer peripheral surface 50b of the belt unit 50. The teeth 51, 52 on the both surfaces of the belt unit 50 project from the same position of the belt unit 50 in the long-edge direction A. Further, the teeth 51 and the teeth 52 project at positions at predetermined intervals in the long-edge direction A of the belt unit 50. A recess 56 is formed at the position of the tooth groove 53 on the inner peripheral surface 50a of the belt unit 50 to extend in the belt width direction B.

The toothed belt 25 is suspended by the plurality of pulleys 19a and 19b in such a manner that the belt width direction B of the belt unit 50 is defined vertical to the transport path 18.

Moreover, the engagement member 26 is made of a non-magnetic metal material, ceramic, or resin, for example. If the engagement member 26 is made of a metal material, the engagement member 26 is formed by a manufacturing process using metal injection. The engagement member 26 comprises an attachment portion 58 attached to the toothed belt 25, and a contact portion 59 to contact a coin (indicated by a sign C1 in FIG. 3).

The attachment portion 58 is connected by a connecting portion 60 at a lower end side corresponding to one end side. At an upper end side corresponding to the other end side of the attachment portion 58, the attachment portion 58 comprises a first gripper 61 and a second gripper 62 separated from each other, a retainer 63 arranged at the upper end side of the first gripper 61, and an insertion portion 64 arranged at the upper end side of the second gripper 62.

The first gripper 61 and the second gripper 62 are fitted into a position between the tooth 51 and 51 adjacent to each other, namely, into the tooth groove 53 of the toothed belt 25, and are fitted into a position between the tooth 52 and 52 adjacent to each other, namely, into the tooth groove 54 of the toothed belt 25. In this way, the belt unit 50 can be caught between the first gripper 61 and the second gripper 62 from a belt thickness direction C. A holding groove 65 catching and holding the belt unit 50 is formed between the first gripper 61 and the second gripper 62.

The retainer 63 projects from the upper end side of the first gripper 61 in an upward direction corresponding to a direction toward the other end side of the holding groove 65. The retainer 63 has a tip located at the same height position or substantially the same height position as the inner surface of the second gripper 62 opposite to the first gripper 61. The dimension of the holding groove 65 in the top-down direction between the retainer 63 and the connecting portion 60 is the same or substantially the same as the dimension of the belt unit 50 in the belt width direction B.

The insertion portion 64 is formed at the inner surface of the second gripper 62 at the upper end side of the second gripper 62 and opposite to the first gripper 61 into a curved shape or a tilted shape to be separated further from the first gripper 61 at a position closer to the upper end side of the second gripper 62. The insertion portion 64 and the retainer 63 are opposite to each other. A clearance allowing insertion of the belt unit 50 into the holding groove 65 is formed between the insertion portion 64 and the retainer 63.

The contact portion 59 is formed into a linear shape extending in a direction perpendicular to the long-edge direction A of the toothed belt 25. The contact portion 59 has a contact surface 66 to contact the peripheral surface of a coin. The contact surface 66 is provided on each of both surfaces of the contact portion 59 corresponding to the long-edge direction A of the toothed belt 25.

An end of the contact surface 66 extending in a linear shape may be formed into a curved shape. More specifically, the contact surface 66 to contact the peripheral surface of a coin may be planar, trapezoidal, or oval. Further, a part of the contact surface 66 corresponding to the lower end thereof to contact a coin may be formed into a comb-like shape. The contact portion 59 of this embodiment extends more widely than the attachment portion 58 in a contact surface width direction as a direction perpendicular to the long-edge direction A of the toothed belt 25 to project from the both sides of the attachment portion 58. In this embodiment, the contact portion 59 projects in a contact portion width direction from the both sides of the attachment portion 58 by the same length L1. Namely, the contact portion 59 projects by the same length L2 from the center of the holding groove 65 of the attachment portion 58 and projects by the same length L2 from the center of the belt thickness direction C of the belt unit 50 to which the attachment portion 58 is attached. The contact portion 59 may project from a side other the both sides of the attachment portion 58. Alternatively, the contact portion 59 may be formed to project from either side. Further, if the contact portion 59 extends from the both sides, the length of the contact portion 59 may differ between the right side and the left side.

The width of the contact portion 59 (width in the contact surface width direction) has the following relationship: (width of contact portion 59) (radius of largest-diameter coin to be handled)–(radius of smallest-diameter coin to be handled).

The contact portion 59 may be formed to the same width as the attachment portion 58 in a direction following the long-edge direction A of the toothed belt 25.

The contact portion 59 of the engagement member 26 attached to the toothed belt 25 is arranged at a predetermined interval from the transport path 18. The predetermined interval from the transport path 18 is an interval less than the thickness of a smallest-thickness coin among coins on the transport path 18 and an interval allowing the contact surface 66 of the contact portion 59 to contact the peripheral surface of the smallest-thickness coin on the transport path 18. The contact portion 59 may contact the transport path 18 on a part of the transport path 18.

It is noted that, the pulleys 19a and 19b are toothed pulleys (timing pulleys) in meshing engagement with the teeth 51 and 52 of the toothed belt 25 in FIG. 1. The tooth 51 on the inner periphery of the toothed belt 25 is in meshing engagement with each pulley 19a. The tooth 52 on the outer periphery of the toothed belt 25 is in meshing engagement with the pulley 19b. These pulleys 19a and 19b are each provided with a groove 68 for accepting the engagement member 26 that moves integrally with the toothed belt 25.

The operation of the coin handling machine 11 will be described next.

During a depositing process, the shutter of the transaction port 13 is opened to accept coins input through the transaction port 13 into the tray 14. After the shutter of the transaction port 13 is closed, the coins in the tray 14 are ejected to the feeder 28 at a lower position.

The coins in the feeder 28 are fed to the transport path 18, transported toward the feeding transporting direction F2 by the coin transporting belt 20, and recognized by the recognition unit 34. A coin recognized as being fit is assigned from the transport path 18 to the temporary holder 30 and held therein. A coin not recognized as being fit is sent from the transport path 18 into the tray 14 and becomes ready to be taken out of the tray 14 in response to opening of the shutter of the transaction port 13.

If deposition is approved after all the coins input through the transaction port 13 have been subjected to the process to be finally held or returned, the coins in the temporary holder 30 are stored into the denomination-specific stacker 29. If the deposition is canceled, the coins in the temporary holder 30 are returned.

More specifically, if the deposition is approved, the coins in the temporary holder 30 are fed to the transport path 18, transported toward the storing transporting direction F1 by the coin transporting belt 20, recognized by the recognition unit 34, and assigned to the denomination-specific stackers 29 of corresponding denominations and stored therein on the basis of recognition results. If the denomination-specific stacker 29 becomes full of coins of a corresponding denomination, these coins are not stored in this denomination-specific stacker 29 but are diverted from the transport path 18 by the diverting portion 45 and then stored into the overflow stacker 38.

If the deposition is canceled, the coins in the temporary holder 30 are fed to the transport path 18, transported in the storing transporting direction F1 by the coin transporting belt 20, and stored into the feeder 28. After all the coins in the temporary holder 30 are moved to the feeder 28, the coins in the feeder 28 are fed to the transport path 18, transported toward the feeding transporting direction F2 by the coin transporting belt 20, and sent from the transport path 18 into the tray 14. The coins in the tray 14 become ready to be taken out in response to opening of the shutter of the transaction port 13.

Additionally, during a dispensing process, coins in the denomination-specific stacker 29 of a denomination to be dispensed are fed to the transport path 18, transported in the feeding transporting direction F2 by the coin transporting belt 20, and recognized by the recognition unit 34. A coin recognized as being fit is sent from the transport path 18 into the tray 14. A coin not recognized as being fit is assigned from the transport path 18 to the temporary holder 30 and held therein.

If the coin not recognized as being fit is sent to the temporary holder 30, feeding of coins from the denomination-specific stacker 29 is finished. After coins of an amount to be dispensed are sent to the tray 14, the coin in the temporary holder 30 is fed to the transport path 18, transported in the storing transporting direction F1 by the coin transporting belt 20, and recognized again by the recognition unit 34. If the coin is recognized as being fit as a result of the re-recognition, the coin is stored into the stacker 29 of a corresponding denomination. If the coin is not recognized as being fit still after the re-recognition, the coin is diverted by the diverting portion 47 of the transport path 18 and stored into the reject box 44.

After the coins of an amount to be dispensed are sent to the tray 14, the coins become ready to be taken out of the tray 14 in response to opening of the shutter of the transaction port 13.

If a sensor detects the presence of coins on the tray 14 remaining even after passage of a predetermined period of time from opening of the shutter of the transaction port 13, these coins are determined to be forgotten coins and the forgotten coins are collected. More specifically, after the shutter of the transaction port 13 is closed, the forgotten coins in the tray 14 are ejected to the feeder 28 at a lower position. The coin handling machine 11 feeds the forgotten coins in the feeder 28 to the transport path 18, transports the forgotten coins toward the feeding transporting direction F2 using the coin transporting belt 20, recognizes the forgotten coins using the recognition unit 34, holds the forgotten coins temporarily in the temporary holder 30, and checks the denominations and the number of the forgotten coins. After making these checks, the coin handling machine 11 feeds the coins from the temporary holder 30 to the transport path 18, diverts the coins using the diverting portion 46 of the transport path 18, and stores the diverted coins into the collection cassette 42.

Additionally, during a replenishment process, the coin handling machine 11 feeds coins stored in the overflow stacker 38 or the coin cassette 39 to the transport mechanism 40, and transports the coins to the temporary holder 30 using the transport mechanism 40. The coin handling machine 11 feeds the coins in the temporary holder 30 to the transport path 18, transports the coins toward the storing transporting direction F1 using the coin transporting belt 20, and recognizes the coins using the recognition unit 34. The coin handling machine 11 assigns and stores the coins to the denomination-specific stackers 29 of corresponding denominations on the basis of recognition results. If the denomination-specific stacker 29 becomes full of coins of a corresponding denomination, these coins are not stored in this denomination-specific stacker 29 but are diverted from the transport path 18 by the diverting portion 45 and then stored into the overflow stacker 38.

The action and operation of the coin transporting belt 20 will be described next.

Figure 2:
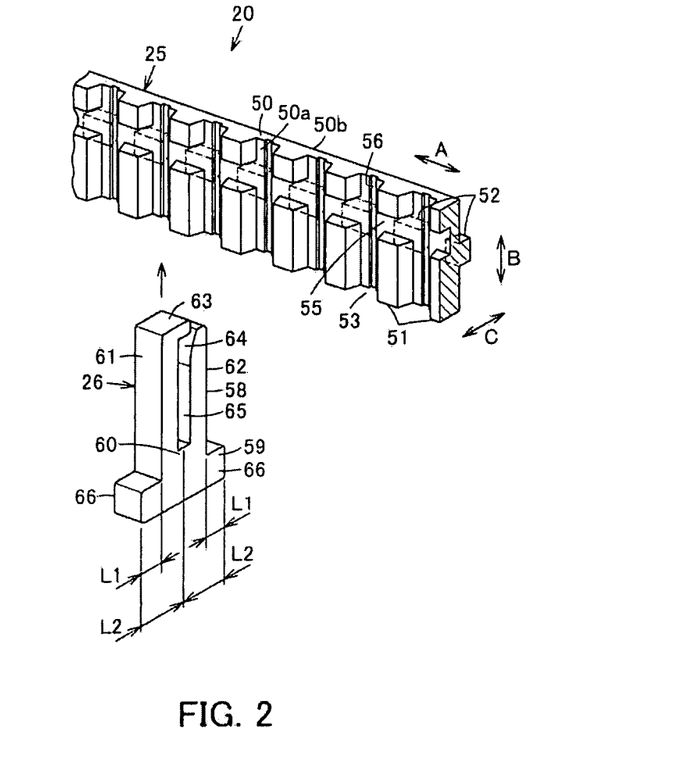
FIG. 2 is a perspective view showing a toothed belt of the first embodiment and an engagement member of the coin transporting belt in a state of being separated from each other.
Figure 3:
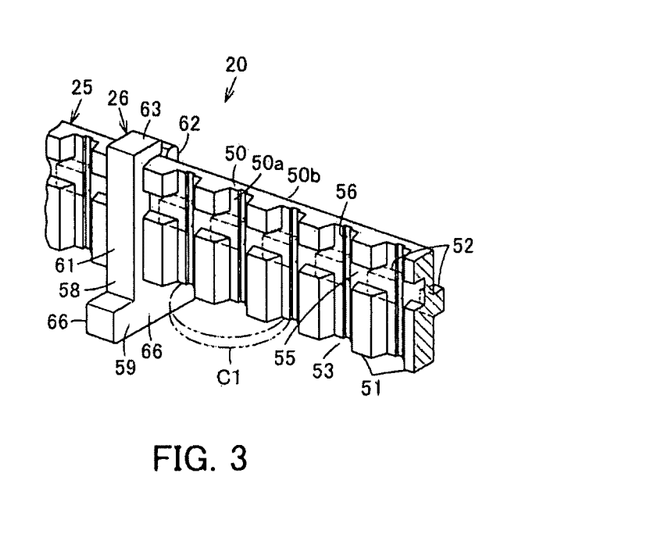
FIG. 3 is a perspective view showing the toothed belt and the engagement member of the coin transporting belt of the first embodiment in a state of being assembled together.
Figure 4:
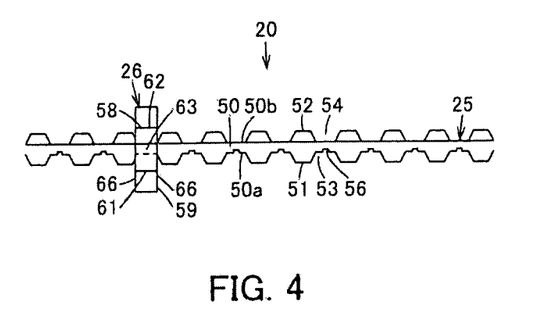
FIG. 4 is a plan view of the coin transporting belt of the first embodiment and the engagement member.

As shown in FIGS. 2 to 4, the engagement member 26 is attached to an optional predetermined position of the toothed belt 25. For attachment of the engagement member 26, the first gripper 61 and the second gripper 62 are fitted to a position between the teeth 51 and 51 and to a position between the teeth 52 and 52 on the both surfaces of the belt unit 50. Next, the clearance between the retainer 63 of the first gripper 61 and the insertion portion 64 of the second gripper 62 is fitted to one edge, namely, a lower edge of the belt unit 50 in the belt width direction B. Then, the engagement member 26 and the toothed belt 25 are moved relative to each other and assembled together in such a manner as to insert or press-fit the belt unit 50 through the clearance between the retainer 63 and the insertion portion 64 into the holding groove 65 between the first gripper 61 and the second gripper 62. At this time, the belt unit 50 is inserted or press-fitted into the holding groove 65 while being deformed elastically into a curved shape or a tilted shape along the insertion portion 64. The lower edge of the belt unit 50 is inserted or press-fitted into a position at which the lower edge comes into abutting contact with the upper surface of the connecting portion 60 corresponding to the bottom of the holding groove 65. The upper edge of the belt unit 50 penetrates into the lower side of the retainer 63. Alternatively, the upper edge does not penetrate but is pressed into the lower side of the retainer 63.

While the engagement member 26 is attached to the toothed belt 25, the belt unit 50 is caught from the belt thickness direction C between the first gripper 61 and the second gripper 62, and the belt unit 50 is held from the belt width direction B between the connecting portion 60 and the retainer 63. Further, the first gripper 61 is fitted into a position between the teeth 51 and 51, and the second gripper 62 is fitted into a position between the teeth 52 and 52. In this way, the engagement member 26 is attached with the attachment portion 58 of the engagement member 26 fixed to the belt unit 50.

The contact portion 59 of the engagement member 26 is arranged in a linear shape extending in a direction perpendicular to the long-edge direction A of the toothed belt 25. Namely, the contact surface 66 of the contact portion 59 is arranged to extend in the direction perpendicular to the long-edge direction A of the toothed belt 25.

As the coin transporting belt 20 suspended over the transport path 18 moves, the contact portion 59 of the engagement member 26 comes into contact with the peripheral surface of a coin on the transport path 18. The coin is moved in a transporting direction while being pushed by the contact portion 59.

It is noted that, to detach the engagement member 26 from the toothed belt 25, the engagement member 26 and the toothed belt 25 are moved relative to each other in a direction of being separated from each other in such a manner as to draw the other edge, namely, the upper edge of the belt unit 50 in the belt width direction B through the clearance between the retainer 63 and the insertion portion 64.

Figure 5:
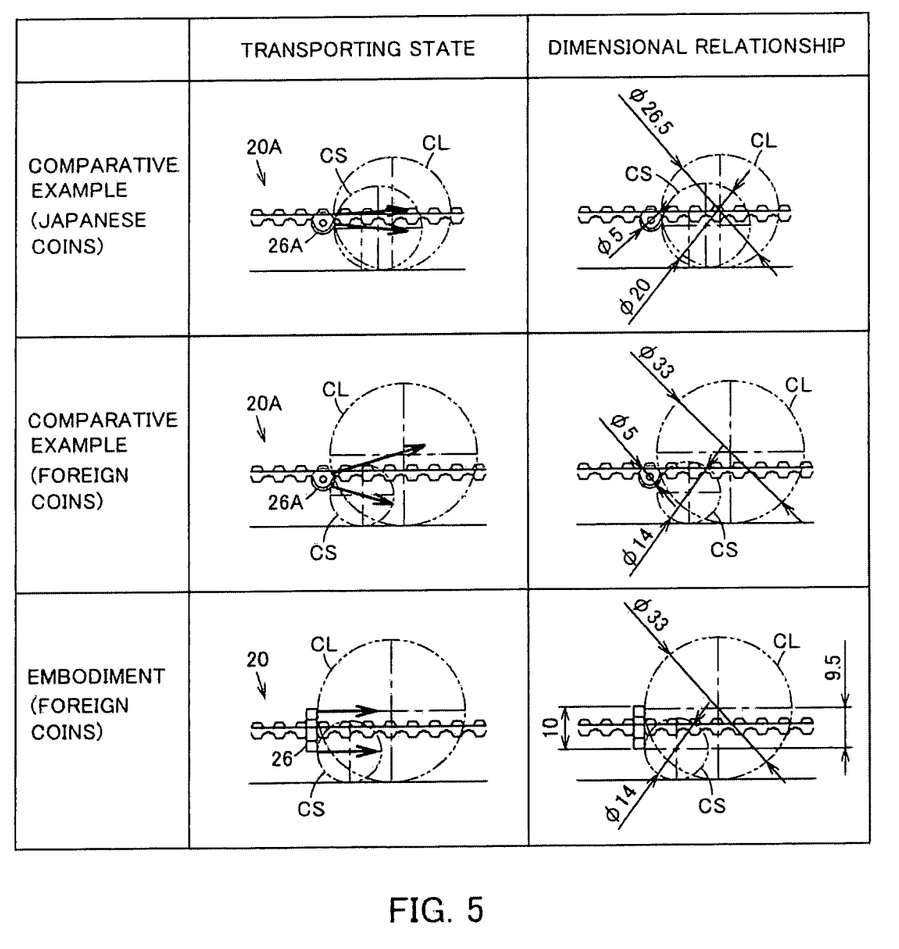
FIG. 5 is a table showing a relationship of the coin transporting belt of the first embodiment with a difference between coin diameters, and a relationship of a coin transporting belt of a comparative example with a difference between coin diameters in terms of a transporting state and a dimensional relationship.

The following describes a relationship of the coin transporting belt 20 of this embodiment with a difference between coin diameters, and a relationship of a coin transporting belt 20A of a comparative example with a difference between coin diameters by referring to FIG. 5. The coin transporting belt 20A of the comparative example comprises an engagement member 26A of a circular columnar shape.

In the case of Japanese coins, a largest-diameter coin CL has a diameter of 26.5 mm and a smallest-diameter coin CS has a diameter of 20 mm to result in a relatively small diameter difference of 6.5 mm. The engagement member 26A of the coin transporting belt 20A of the comparative example has a diameter of 5 mm. In the case of the coin transporting belt 20A of the comparative example, when the peripheral surface of the engagement member 26A contacts the peripheral surfaces of the largest-diameter coin CL and the smallest-diameter coin CS to push the largest-diameter coin CL and the smallest-diameter coin CS toward a transporting direction, the peripheral surface of the engagement member 26A contacts peripheral surface positions relatively near the center line of the transporting direction of the largest-diameter coin CL and the smallest-diameter coin CS. By doing so, both the largest-diameter coin CL and the smallest-diameter coin CS are pushed in a direction substantially following the transporting direction to allow transporting of the coins substantially stably.

Additionally, in the case of foreign coins, the largest-diameter coin CL may have a diameter of 33 mm and the smallest-diameter coin CS may have a diameter of 14 mm to result in a large diameter difference of 19 mm. In the case of the coin transporting belt 20A of the comparative example, when the peripheral surface of the engagement member 26A contacts the peripheral surfaces of the largest-diameter coin CL and the smallest-diameter coin CS to push the largest-diameter coin CL and the smallest-diameter coin CS toward a transporting direction, the peripheral surface of the engagement member 26A contacts peripheral surface positions largely deviating from the center line of the transporting direction of the largest-diameter coin CL and the smallest-diameter coin CS. Hence, both the largest-diameter coin CL and the smallest-diameter coin CS are pushed obliquely from the transporting direction. This unfortunately causes separation of the largest-diameter coin CL from one of the guide portions 23 as a reference for transporting on the transport path 18, or causes the coin transporting belt 20A to move in the width direction of the transport path 18 to make the engagement member 26A get over the smallest-diameter coin CS, for example. In this way, stable transporting of coins is hindered.

By contrast, the width of the contact portion 59 (width in a contact surface width direction) in the coin transporting belt 20 of this embodiment has the following relationship: (width of contact portion 59)≥(radius of largest-diameter coin CL to be handled)−(radius of smallest-diameter coin CS to be handled). Thus, in the case of foreign coins, the width of the contact portion 59 is determined as follows: 9.5 mm≥16.5 mm−7 mm. Here, the width of the contact portion 59 (width in the contact surface width direction) is set to 10 mm, for example.

In the case of such foreign coins, when the contact surface 66 of the contact portion 59 of the engagement member 26 contacts the peripheral surfaces of the largest-diameter coin CL and the smallest-diameter coin CS to push the largest-diameter coin CL and the smallest-diameter coin CS toward a transporting direction, the contact surface 66 of the contact portion 59 of the engagement member 26 contacts the largest-diameter coin CL and the smallest-diameter coin CS on the center line of the transporting direction of the largest-diameter coin CL and the smallest-diameter coin CS to allow the largest-diameter coin CL and the smallest-diameter coin CS to be pushed toward the transporting direction. In this way, stable transporting of the coins is achieved.

As described above, in the coin transporting belt 20 of this embodiment, the contact portion 59 of the engagement member 26 is provided in a linear shape extending in a direction perpendicular to the long-edge direction A of the toothed belt 25. This allows stable transporting of coins even if a diameter difference between the coins is large.

The coin transporting belt 20 uses the toothed belt 25 with the plurality of teeth 51 and 52 formed on the both surfaces of the belt unit 50. Furthermore, this makes the coin transporting belt 20 adaptable to the transport path 18 of a configuration in which the inner peripheral surface 50a and the outer peripheral surface 50b of the toothed belt 25 are wound around the pulleys 19a and 19b, for example.

Additionally, the attachment portion 58 of the engagement member 26 can be attached to an optional predetermined position of the toothed belt 25 with the plurality of teeth 51 and 52 formed on the both surfaces of the belt unit 50 in such a manner as to be removable from the toothed belt 25. This achieves use of the toothed belt 25 for general purpose available at low cost. Additionally, the position of attachment of the engagement member 26 to the toothed belt 25 can be changed easily in response to the pitch of the engagement member 26 in the long-edge direction A of the toothed belt 25.

Moreover, the contact portion 59 of the engagement member 26 extends more widely than the attachment portion 58 in a direction perpendicular to the long-edge direction A of the toothed belt 25 to project from the both sides of the attachment portion 58. Thus, even if there is a limitation on the width of the attachment portion 58 to pass through the pulleys 19a and 19b, the width of the contact portion 59 can be ensured to achieve adaptability to a difference between coin diameters.

Additionally, the contact portion 59 of the engagement member 26 projects from the both sides of the attachment portion 58 by the same length L1. This makes it possible to locate the projecting both ends of the contact portion 59 as close as possible to the toothed belt 25 while ensuring the width of the contact portion 59. Even if a coin contacts each of the projecting ends of the contact portion 59, rotation of the engagement member 26 is prevented to reduce the occurrence of twist of the toothed belt 25. Further, even if the engagement member 26 is attached to the toothed belt 25 in a reversed orientation, a relationship in terms of position between the contact portion 59 and the toothed belt 25 can be maintained constantly. The foregoing configuration allows stable transporting of coins.

Furthermore, the width of the contact portion 59 of the engagement member 26 (width in a contact surface width direction) has the following relationship: (width of contact portion 59) (radius of largest-diameter coin CL to be handled)−(radius of smallest-diameter coin CS to be handled). This causes the contact portion 59 of the engagement member 26 to always contact the largest-diameter coin CL and the smallest-diameter coin CS on the center line of a transporting direction of the largest-diameter coin CL and the smallest-diameter coin CS to allow the largest-diameter coin CL and the smallest-diameter coin CS to be pushed toward the transporting direction, thereby allowing stable transporting of coins.

Moreover, the attachment portion 58 of the engagement member 26 grips the toothed belt 25 in such a manner as to be removable from the toothed belt 25. This achieves use of the toothed belt 25 for general purpose and attachment of the engagement member 26 to an optional predetermined position of the toothed belt 25 in a manner that allows removal of the engagement member 26.

Additionally, the attachment portion 58 of the engagement member 26 is connected at the lower end side. At the upper end side of the attachment portion 58, the attachment portion 58 is separated and comprises the first gripper 61 and the second gripper 62 catching the belt unit 50 of the toothed belt 25 therebetween, and the retainer 63 arranged at the upper end side of the first gripper 61 and engaged with the upper end side of the toothed belt 25. Thus, the attachment portion 58 can be attached to the toothed belt 25 in such a manner as to be removable from the toothed belt 25.

It is noted that the retainer 63 may be provided further to the second gripper 62. In this case, the retainer 63 of the first gripper 61 and the retainer 63 of the second gripper 62 may be formed as claws opposite to each other, and the belt unit 50 of the toothed belt 25 may be attached by being press-fitted into a position between the claw-like retainers 63.

The coin handling machine 11 using the foregoing coin transporting belt 20 transports coins stably along the transport path 18 to allow stable implementation of process.

Figure 6:
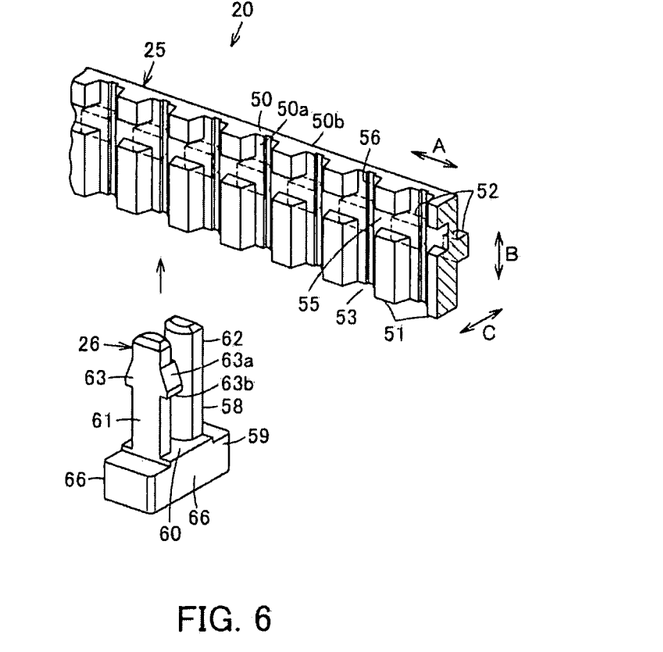
FIG. 6 is a perspective view showing a toothed belt and an engagement member of a coin transporting belt in a state of being separated from each other showing a second embodiment of the present invention.
Figure 7:
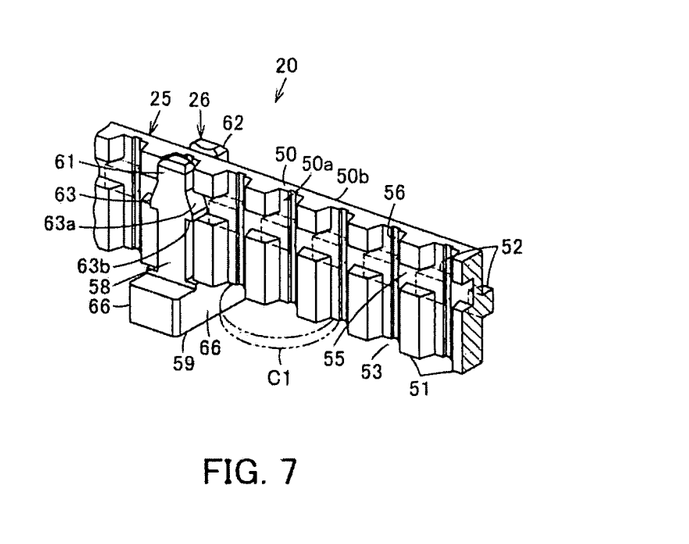
FIG. 7 is a perspective view showing the toothed belt and the engagement member of the coin transporting belt of the second embodiment in a state of being assembled together.

A second embodiment shown in FIGS. 6 and 7 will be described next.

The attachment portion 58 of the engagement member 26 is connected at a lower end side. At an upper end side of the attachment portion 58, the attachment portion 58 is separated and comprises the first gripper 61 and the second gripper 62 catching the belt unit 50 of the toothed belt 25 therebetween, and the retainer 63 arranged at the first gripper 61 and engaged with the tooth 51 of the toothed belt 25.

It is noted that the retainer 63 is provided at an intermediate position of the first gripper 61 in the top-down direction to project from both side surfaces of the first gripper 61 parallel to the contact surface 66. The retainer 63 is formed into a claw-like shape having a tilted surface 63a tilted toward a side corresponding to the tip of the first gripper 61, and an engagement surface 63b provided on the opposite side substantially vertical to the first gripper 61.

The contact portion 59 projects more widely than the attachment portion 58 in a direction following the long-edge direction A of the toothed belt 25.

For attachment of the engagement member 26 to the toothed belt 25, the first gripper 61 and the second gripper 62 are fitted to a position between the teeth 51 and 51 and to a position between the teeth 52 and 52 on the both surfaces of the belt unit 50. Next, a clearance between the tips of the first gripper 61 and the second gripper 62 is fitted to one edge, namely, a lower edge of the belt unit 50 in the belt width direction B. Then, the engagement member 26 and the toothed belt 25 are moved relative to each other and assembled together in such a manner as to insert or press-fit the belt unit 50 into the holding groove 65 between the first gripper 61 and the second gripper 62. At this time, the retainer 63 of the first gripper 61 abuts on the tooth 51 and this abutment is formed between the tilted surface 63a of the retainer 63 and the tooth 51. This allows assembling of the engagement member 26 and the toothed belt 25 together while the toothed belt 25 is deformed elastically without causing hooking of the retainer 63 on the tooth 51 or while the clearance between the tips of the first gripper 61 and the second gripper 62 is increased. The lower edge of the belt unit 50 is inserted into a position at which the lower edge comes into abutting contact with the upper surface of the connecting portion 60 corresponding to the bottom of the holding groove 65. The retainer 63 is fitted into the cutout 55 resulting from cutting of a part of the tooth 51.

While the engagement member 26 is attached to the toothed belt 25, the belt unit 50 is caught from the belt thickness direction C between the first gripper 61 and the second gripper 62, and the belt unit 50 is held from the belt width direction B between the connecting portion 60 and the engagement surface 63b of the retainer 63 engaged with the tooth 51. Further, the first gripper 61 is fitted into a position between the teeth 51 and 51, and the second gripper 62 is fitted into a position between the teeth 52 and 52. In this way, the engagement member 26 is attached with the attachment portion 58 of the engagement member 26 fixed to the belt unit 50.

It is noted that, to detach the engagement member 26 from the toothed belt 25, the retainer 63 is separated from the tooth 51, and the engagement member 26 and the toothed belt 25 are moved relative to each other in a direction of being separated from each other.

The attachment portion 58 of the engagement member 26 is connected at the lower end side. At the upper end side of the attachment portion 58, the attachment portion 58 is separated and comprises the first gripper 61 and the second gripper 62 catching the belt unit 50 of the toothed belt 25 therebetween, and the retainer 63 provided at the first gripper 61 and engaged with the tooth 51 of the toothed belt 25. Thus, the attachment portion 58 can be attached to the toothed belt 25 in such a manner as to be removable from the toothed belt 25.

It is noted that, if the cutouts 55 and 55 are provided together with the teeth 51 and 52 on the both surfaces of the toothed belt 25, the retainer 63 may be provided further at the second gripper 62.

It is noted that, the retainer 63 of the engagement member 26 may have a configuration other than the configuration of each of the foregoing embodiments. If the belt unit 50 of the toothed belt 25 has a hole, for example, the retainer 63 of at least one of the first gripper 61 and the second gripper 62 may be configured as a projection to be engaged with the hole at the belt unit 50.

Additionally, in the coin handling machine 11 of each of the embodiments, the transport path 18 is not limited to a tilted shape. The transport path 18 having a horizontal shape also allows transporting of coins using the coin transporting belt 20.

While the first and second embodiments and the modifications have been described above, the embodiments and the modifications can be combined, as appropriate, within a range not deviating from the substance of the present invention.

The invention claimed is:

1. A coin transporting belt comprising:
   a toothed belt with teeth on both surfaces of a belt; and
   an engagement portion attached to the toothed belt, the engagement portion configured to contact a peripheral surface of a coin and transport the coin along a transport path,
   the engagement portion comprising:
   an attachment portion attached to the toothed belt and extending along the toothed belt in a first direction perpendicular to a long-edge direction of the toothed belt and to the transport path; and
   a contact portion including a contact surface having a linear shape extending from the attachment portion in a second direction perpendicular to the long-edge direction of the toothed belt and to the transport path, the second direction being perpendicular to the first direction, the contact surface directly contacting the coin.

2. The coin transporting belt according to claim 1, wherein
   the contact portion extends more widely than the attachment portion in the first direction to project from at least both sides of the attachment portion.

3. The coin transporting belt according to claim 2, wherein
   the contact portion projects from both sides of the attachment portion by the same length in the first direction.

4. The coin transporting belt according to claim 1, wherein
   the contact portion projects from one side of the attachment portion in the first direction.

5. The coin transporting belt according to claim 1, wherein
   the contact portion has a width portion in the first direction that is greater than or equal to a difference between a radius of a largest-diameter coin to be handled and a radius of a smallest-diameter coin to be handled.

6. The coin transporting belt according to claim 1, wherein
   the contact portion has a planar contact surface which contacts the coin.

7. The coin transporting belt according to claim 1, wherein
   the contact portion has a comb shaped contact surface at a part to contact the coin.

8. The coin transporting belt according to claim 1, wherein
the contact portion has an oval contact surface which contacts the coin.

9. The coin transporting belt according to claim 1, wherein
the contact portion has planar contact surfaces which contact the coin provided on both surfaces of the contact portion and extending in the long-edge direction of the toothed belt.

10. The coin transporting belt according to claim 1, wherein
the contact portion projects more widely than the attachment portion in the long-edge direction of the toothed belt.

11. The coin transporting belt according to claim 1, wherein
the attachment portion grips the belt.

12. The coin transporting belt according to claim 1, wherein
the attachment portion is connected at one end side, and separated at the other end, the attachment portion comprises a first gripper and a second gripper catching the belt of the toothed belt therebetween, and a retainer arranged at least at the first gripper at the other end side and engaged with the toothed belt.

13. The coin transporting belt according to claim 1, wherein
the attachment portion is connected at one end side, and separated at the other end side, the attachment portion comprises a first gripper and a second gripper catching the belt of the toothed belt therebetween, and a retainer arranged at least at the first gripper and engaged with the tooth of the toothed belt.

14. The coin transporting belt according to claim 13, wherein
the toothed belt comprises a cutout resulting from cutting of a part of the tooth, and
the retainer is fitted into the cutout at the tooth.

15. A coin handling machine comprising:
the transport path along which the coin is to move; and
the coin transporting belt according to claim 1 suspended over the transport path and engaging and transporting the coin on the transport path using the engagement portion.

16. The coin transporting belt according to claim 1, wherein the contact portion has a flat surface that contacts the coin.

17. The coin transporting belt according to claim 1, wherein the attachment portion includes a first gripper and a second gripper spaced apart at an upper end of the attachment portion to receive the belt of the toothed belt therebetween, a connection portion connecting the first gripper and the second gripper at a lower end of the attachment portion.

18. The coin transporting belt according to claim 17, wherein the contact portion is below the connection portion and is centered with the connection portion.

19. The coin transporting belt according to claim 18, further comprising a retainer extending along the second direction path from one of the first and second grippers at the upper end of the attachment portion and an insertion portion formed in another of the first and second grippers to provide a clearance space for the belt of the toothed belt between the retainer and the other of the first and second grippers at an oblique angle to a second thickness direction.

20. The coin transporting belt according to claim 19, wherein a space between the retainer and the insertion portion along the second direction is less than a belt thickness along the second direction.

* * * * *